US 11,412,369 B2

(12) United States Patent
Gharout et al.

(10) Patent No.: US 11,412,369 B2
(45) Date of Patent: Aug. 9, 2022

(54) METHOD FOR OBTAINING A COMMAND RELATING TO A PROFILE FOR ACCESSING A NETWORK

(71) Applicant: ORANGE, Issy-les-Moulineaux (FR)

(72) Inventors: Said Gharout, Chatillon (FR); Laurent Coureau, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 266 days.

(21) Appl. No.: 16/603,474

(22) PCT Filed: Apr. 4, 2018

(86) PCT No.: PCT/FR2018/050845
§ 371 (c)(1),
(2) Date: Oct. 7, 2019

(87) PCT Pub. No.: WO2018/185435
PCT Pub. Date: Oct. 11, 2018

(65) Prior Publication Data
US 2020/0389439 A1    Dec. 10, 2020

(30) Foreign Application Priority Data

Apr. 7, 2017  (FR) .................................... 1753051

(51) Int. Cl.
*H04L 9/40*       (2022.01)
*H04W 12/02*      (2009.01)
(Continued)

(52) U.S. Cl.
CPC ............. *H04W 8/20* (2013.01); *H04L 9/3255* (2013.01); *H04L 63/0421* (2013.01);
(Continued)

(58) Field of Classification Search
CPC ....... H04W 8/20; H04W 12/40; H04W 12/02; H04W 12/06; H04L 9/3255; H04L 63/0421; H04L 63/0869; H04L 63/0876
See application file for complete search history.

(56) References Cited

U.S. PATENT DOCUMENTS

| 9,888,385 B1* | 2/2018 | Oh ...................... H04W 12/069 |
| 2008/0293378 A1* | 11/2008 | Hinton ................ H04L 63/0407 |
| | | 455/411 |

(Continued)

FOREIGN PATENT DOCUMENTS

WO    WO2017089672 A1    6/2017

OTHER PUBLICATIONS

24. Vesselkov et al. "Value networks of embedded SIM-based remote subscription management", IEEE, 2015 , 7 pages (Year: 2015).*

(Continued)

*Primary Examiner* — Catherine Thiaw
(74) *Attorney, Agent, or Firm* — David D. Brush; Westman, Champlin & Koehler, P.A.

(57) ABSTRACT

A method for obtaining a command relating to a profile for a security module of the equipment to access a network by mobile equipment. The method includes: sending, to a first server, a request including an anonymous identifier of the security module based on a physical identifier of the module and a random variable; receiving, from the first server, an address of a second server, which prepared the command and associated the command with the anonymous identifier, a request of the command having been previously received from a third server via the second server; sending, to the second server, the physical identifier of the module and of the random variable; receiving, from the second server, the command when a verification by the second server that the anonymous identifier of the security module has been com- (Continued)

puted on the basis of the received physical identifier and of the random variable is positive.

11 Claims, 2 Drawing Sheets

(51) Int. Cl.
    *H04W 12/06*     (2021.01)
    *H04W 12/40*     (2021.01)
    *H04L 9/32*     (2006.01)
    *H04W 8/20*     (2009.01)

(52) U.S. Cl.
    CPC ...... *H04L 63/0869* (2013.01); *H04L 63/0876* (2013.01); *H04W 12/02* (2013.01); *H04W 12/06* (2013.01); *H04W 12/40* (2021.01)

(56) References Cited

U.S. PATENT DOCUMENTS

| | | | | |
|---|---|---|---|---|
| 2014/0329502 | A1* | 11/2014 | Lee | H04W 12/04 455/411 |
| 2016/0127132 | A1* | 5/2016 | Lee | H04L 9/0819 713/156 |
| 2016/0301529 | A1 | 10/2016 | Park et al. | |
| 2017/0064552 | A1 | 3/2017 | Park et al. | |
| 2018/0294949 | A1* | 10/2018 | Yang | H04W 12/42 |

OTHER PUBLICATIONS

GSM Association: "Remote Provisioning Architecture for Embedded UICC Technical Specification Version 3.0", Jun. 30, 2015 (Jun. 30, 2015), pp. 1-301, XP055355798.

International Search Report dated May 29, 2018 for corresponding International Application No. PCT/FR2018/050845, filed Apr. 4, 2018.

Written Opinion of the International Searching Authority dated May 29, 2018 for corresponding International Application No. PCT/FR2018/050845, filed Apr. 4, 2018.

English translation of the International Written Opinion of the International Searching Authority dated May 29, 2018 for corresponding International Application No. PCT/FR2018/050845, filed Apr. 4, 2018.

* cited by examiner

METHOD FOR OBTAINING A COMMAND RELATING TO A PROFILE FOR ACCESSING A NETWORK

CROSS-REFERENCE TO RELATED APPLICATIONS

This application is a Section 371 National Stage Application of International Application No. PCT/FR2018/050845, filed Apr. 4, 2018, the content of which is incorporated herein by reference in its entirety, and published as WO 2018/185435 on Oct. 11, 2018, not in English.

FIELD OF THE DISCLOSURE

The present invention pertains to the general field of telecommunications. It relates more particularly to a method for obtaining a command relating to a profile for accessing a telecommunications network via a mobile equipment.

It is applied to particular benefit in the context of the use of security modules embedded in consumer mobile equipment, for example for loading a profile for accessing the network after subscribing to a service offer from a mobile network operator, or for remotely configuring or updating the profile, etc.

BACKGROUND OF THE DISCLOSURE

The association of mobile telephony operators, or "GSMA" (for Global System for Mobile Communications) has developed an embedded "SIM" (for subscriber identity module) card standard, or "eSIM", of "eUICC" (for embedded universal integrated circuit card) type for consumer mobile equipment, such as a mobile terminal or a tablet. An embedded SIM card is intended to be non-removable and remotely (re)programmable. Thus, when acquiring a new mobile equipment, it is no longer necessary to manipulate the SIM card beforehand in order to access an operator's network, or even to change it upon a change of operator. There is provision for a user to subscribe directly via the screen of his mobile equipment, or by visiting an outlet of the operator, and to load a profile for accessing the network and/or to set his profile over time from his mobile equipment, or even for him to change operator in the same way. An eSIM card is identified uniquely by way of a module identifier or "EID" (for eUICC identifier), which constitutes a physical identifier of the card that is defined in the factory and is not modifiable. This identifier is therefore considered to be sensitive data from a privacy protection point of view that is not able to be exposed without the consent of the user of the mobile equipment.

In the case for example of obtaining and loading an initial profile for accessing the network via a mobile equipment, the GSMA makes provision, when subscribing to a subscription with a mobile network operator, to manage, in an intermediate server of the network that is independent of the operators, a correspondence between the EID identifier of an eUICC security module and the operator to which the subscription has been subscribed and for which the operator holds an access profile that it has generated for the module. When a mobile equipment wishes to obtain a profile for accessing the network following a subscription to an operator, it addresses the intermediate server, usually called "discovery server", which identifies the operator that generated a profile for this equipment on the basis of the EID identifier of the security module of the mobile equipment. The intermediate server then sends the mobile equipment the address of a management server of the operator, usually called "data preparation server", from which the equipment is able to obtain its profile. The mobile equipment then establishes a connection to the management server of the operator so as to recover its profile and install it in the security module. This mode of operation requires sharing the identifier of the security module with the intermediate server of the network that stores correspondences between EID identifiers of security modules and management server addresses of operators that generate the profiles for accessing the network.

Such a solution offers a certain flexibility in terms of the management of subscriptions by the user, who is easily able to command the activation of an initial subscription, or of a new subscription in the case of changing operator, from his mobile equipment. However, this mode of operation requires sharing the EID identifier of the security module with the intermediate server of the network that stores correspondences between a security module identifier and a management server address of the operator that generated the profile for accessing the network. The intermediate server is thus capable of tracing the EID identifier of a security module and of jeopardizing the privacy of the user of the mobile equipment. Moreover, the EID identifier of the security module is exposed on the network by being transmitted and/or shared between a plurality of entities of the network, without the user of the mobile equipment having given his consent at any time.

This non-modifiable identifier is considered to be sensitive data the exposure of which should be reduced as far as possible.

SUMMARY

One of the aims of the invention is to rectify inadequacies/drawbacks of the prior art and/or to provide improvements thereto.

To this end, the invention proposes a method for obtaining a command relating to a profile for accessing a network via a mobile equipment, the command being intended to be implemented on a security module of said equipment, said method comprising:
  sending, to a first server, an information obtainment request intended to obtain the command, said request comprising an anonymous identifier of the security module calculated from a physical identifier of the module and from a random,
  receiving, from the first server, an address of a second server, said second server having prepared the command and associated said command with the anonymous identifier of the security module, a request for said command associated with said anonymous identifier having been received beforehand by the second server from a third server,
  sending, to the second server, the physical identifier of the module and the random,
  receiving, from the second server, said command when a check, by the second server, that the anonymous identifier of the security module has been calculated from the received physical identifier and from the random is positive.

Using the method described here, the mobile equipment calculates an anonymous identifier that it is able to use to obtain a command relating to a profile for accessing the network without compromising the privacy of the user of the mobile equipment. Specifically, the use of an anonymous identifier instead of the physical identifier of the security module makes it impossible to trace the physical identifier through the various commands that the user of the equipment gives to a mobile network operator. The physical identifier of a security module is sensitive data, in the same way as personal data of the user. It therefore requires particular attention and may not be exposed in any case without prior agreement from the user of the mobile equipment. The method for obtaining a command relating to an access profile allows this. Specifically, the anonymous identifier is able to be used by applications and servers without requiring agreement from the user of the equipment. This is the case for the first server, or discovery server, which at no time knows the real physical identifier associated with the anonymous identifier with which the address of the second server from which the mobile equipment is able to obtain its command is associated. This is also the case for the third server, or operator server, to which the mobile equipment sends the information necessary for the command. It should be noted that the mobile equipment provides the second server, or data preparation server, with its physical identifier and the random used to calculate the temporary identifier, and thus proves that the security module is indeed the module for which a command has been prepared. This sending is necessary in order to obtain the command, and constitutes the consent of the user to disclose the physical identifier of the security module at this stage.

The anonymous identifier that is calculated is also temporary, a new anonymous identifier being calculated each time the user gives a command. This makes it impossible to establish relationships between successive commands given from one and the same mobile equipment.

In one particular embodiment, the received address of the second server is associated with the anonymous identifier of the security module.

In one exemplary embodiment, the method comprises:
calculating the anonymous identifier of the security module by applying a one-way function to the physical identifier of the module and to the random, said one-way function also having a non-collision property,
sending said anonymous identifier to the third server.

The anonymous identifier is derived from the physical identifier of the security module by way of a one-way function that also has a non-collision property. It is recalled that a one-way function is able to be calculated easily but is difficult to reverse, that is to say for any x whose image $z=f(x)$ is known, it is very difficult to find x (again). In other words, it is very difficult to find the reverse application of $f$. The use of a one-way function to calculate the anonymous identifier makes it possible to guarantee the anonymity of the security module. Specifically, the physical identifier of the module, usually denoted EID, is not able to be deduced from the anonymous identifier. The non-collision property of the one-way function moreover guarantees the uniqueness of the generated anonymous identifiers.

In one exemplary embodiment, the method comprises mutual authentication between the security module and the first server, said authentication being representative of an agreement of the user to disclose the physical identifier of the security module to the first server.

In this example, there is mutual authentication between the security module and the first server, or discovery server. This authentication requires exposing the physical EID identifier of the security module to the discovery server. This authentication, when it is implemented, constitutes implicit consent of the user to disclose the physical identifier of his module.

In another exemplary embodiment, the method comprises anonymous authentication of the security module to the first server, implemented by way of a group signature algorithm.

An anonymous authentication based for example on a group signature algorithm makes it possible not to disclose the physical EID identifier of the security module to the first server. However, the server knows, when the authentication is successful, that it is dealing with a valid eUICC module.

The invention also relates to a method for providing, to a mobile equipment, via a first server, a command relating to a profile for accessing a network, the command being intended to be implemented on a security module of said equipment, said method comprising:
receiving, from a second server, a request for said command associated with an anonymous identifier of the security module, said anonymous identifier having been calculated from a physical identifier of the module and from a random,
preparing said command and sending, to a third server, a notification intended to indicate that the command has been prepared, the notification comprising the address of the first server and the anonymous identifier,
connecting the mobile equipment to the first server, the address of the first server having been provided beforehand to the mobile equipment by the third server,
receiving, from the security module, the physical identifier of the module and the random, and checking that the anonymous identifier received from the mobile equipment has been calculated from the physical identifier of the module and from the random, and
delivering said command when the check is positive.

The invention also relates to a mobile equipment designed to obtain a command relating to a profile for accessing a network, the command being intended to be implemented on a security module of said equipment, said mobile equipment comprising:
first sending means, designed to send, to a first server, an information obtainment request intended to obtain the command, said request comprising an anonymous identifier of the security module calculated from a physical identifier of the module and from a random,
first reception means, designed to receive, from the first server, an address of a second server, said second server having prepared the command and associated said command with the anonymous identifier of the security module, a request for said command associated with said anonymous identifier having been received beforehand by the second server from a third server,
second sending means, designed to send, to the second server, the physical identifier of the module and the random,
second reception means, designed to receive, from the second server, said command when a check, by the second server, that the anonymous identifier of the security module has been calculated from the received physical identifier and from the random is positive.

In one particular embodiment, the address of the second server received by the first reception means is associated with the anonymous identifier of the security module.

The invention also relates to a computer program on a data medium and able to be loaded into the memory of a computer, the program comprising code portions for executing the steps of the method for obtaining a command relating to a profile for accessing a network via a mobile equipment as described above when the program is executed on said computer.

The invention also relates to a data medium on which the above program is recorded. The invention also relates to a server designed to prepare and provide a command relating to a profile for accessing the network requested from a mobile equipment, the command being intended to be implemented on a security module of said equipment, said server comprising:

reception means, designed to receive, from a second server, a request for said command associated with an anonymous identifier of the security module, said anonymous identifier having been calculated from a physical identifier of the module and from a random, preparation means, designed to prepare said command and to send, to a third server, a notification intended to indicate that the command has been prepared, the notification comprising the address of the first server and the anonymous identifier, connection means, designed to accept a connection of the mobile equipment, the address of the server having been provided beforehand to the mobile equipment by the third server, reception and checking means, designed to receive, from the security module, the physical identifier of the module and the random, and to check that the anonymous identifier received from the mobile equipment has been calculated from the physical identifier of the module and from the random, and delivery means, designed to deliver said command when the check is positive.

The invention also relates to a computer program on a data medium and able to be loaded into the memory of a computer, the program comprising code portions for executing the steps of the method for providing, to a mobile equipment, via a first server, a command relating to a profile for accessing a network when the program is executed on said computer.

The invention also relates to a data medium on which the above program is recorded.

The invention also relates to a system for providing a command relating to a profile for accessing a network, said system comprising:

at least one mobile equipment as described above,
at least one first server as described above,
a second server, comprising:
a first reception module, designed to receive, from the first server, a notification intended to indicate that a command has been prepared, the notification comprising the address of the first server and an anonymous identifier of a security module,
a second reception module, designed to receive, from the mobile equipment, an information obtainment request intended to obtain the command, said request comprising an anonymous identifier of the security module;
a sending module, designed to send, to the mobile equipment, the address of the first server associated with the anonymous identifier, the mobile equipment being able to retrieve said command from said first server.

In one particular embodiment, a system for providing a command relating to a profile for accessing a network comprises:

at least one mobile equipment as described above,
at least one server as described above,
a second server, comprising:
a first module for receiving anonymous identifiers, designed to receive, from the first server, a request comprising the current anonymous identifier of the security module, associated with an address of the first server,
a second reception module, designed to receive, from the mobile equipment, an information request comprising the anonymous identifier of the security module,
a first sending module, designed to send, to the mobile equipment, the address of the first server associated with the anonymous identifier, the mobile equipment being able to retrieve said command from said first server.

BRIEF DESCRIPTION OF THE DRAWINGS

Other features and advantages of the present invention will be better understood from the description and the appended drawings, in which.

DETAILED DESCRIPTION OF ILLUSTRATIVE EMBODIMENTS

Figure 1:
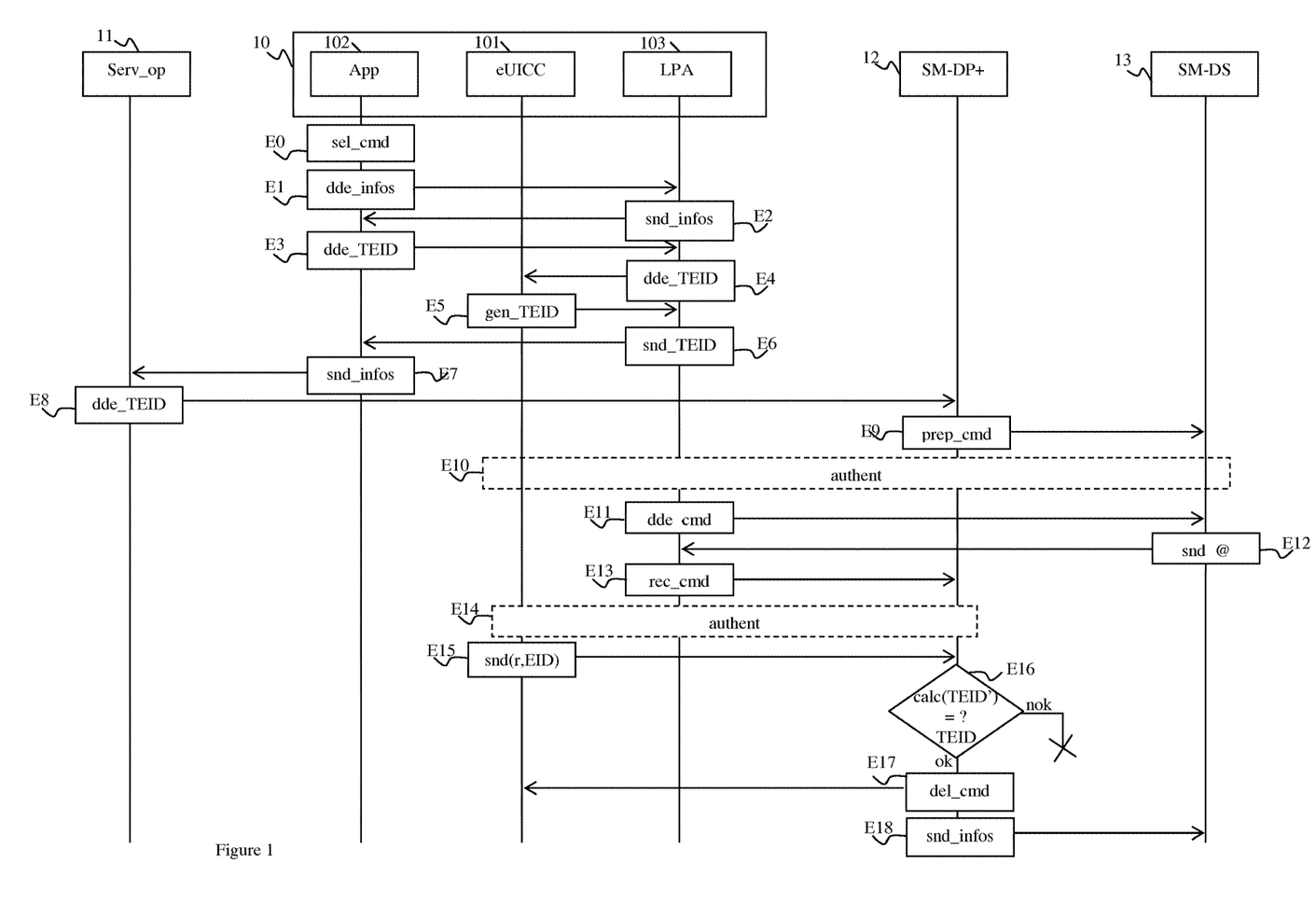
FIG. 1 shows the steps of a method for obtaining a command relating to a profile for accessing a network, according to one exemplary embodiment.

The steps of a method for obtaining a command relating to a profile for accessing the network via a mobile equipment according to one exemplary embodiment will now be described with reference to FIG. 1.

A user mobile equipment 10 (the user is not shown in FIG. 1), for example a mobile terminal or a tablet, is equipped with an embedded security module 101, or eSIM, of eUICC (for embedded universal integrated circuit card) type, or a non-removable security module. The security module 101 is identified by a physical EID (for eUICC identifier) card identifier that is defined in the factory. The mobile equipment 10 also comprises a mobile application 102 designed to allow the user to initiate and/or validate a command relating to a profile for accessing a telecommunications network. The mobile application 102 is provided by a service provider, for example a mobile network operator. The access profile is intended to allow the user to access the network from the mobile equipment 10. "Command relating to an access profile" is understood to mean a command comprising code instructions intended to be executed on the security module 101. For example, the command consists in loading the profile for accessing the network on the security module and in activating the profile after the user has subscribed to an associated service offer with an operator, or in configuring or updating the access profile loaded beforehand in the security module 101, followed by validation of this configuration or this update by the user. To this end, the mobile application 102 is designed to communicate, to a first server 11, called "operator server", data that comprise the physical features of the mobile equipment 10 and of the security module 101, and data corresponding to the command relating to the access profile and validated by the user. The operator server 11 is designed to ask a second server 12, called "data preparation server", to prepare the command relating to the profile for accessing the network for a security module of the type of that of the mobile equipment 10. The data preparation server 12 is designed to prepare the command that it has received and to notify a third server 13, called "discovery server", that an event is queued for a security module that it designates by way of an anonymous identifier. This event notification makes it possible to indicate to the discovery server 13 that a command relating to an access profile has been prepared and is available on the preparation server 12, without providing information with regard to the content of this command to the discovery server 13. "Available" means that the command is able to be retrieved in order to be implemented on the mobile equipment 10. The mobile equipment 10 is also designed to address the discovery server 13 in order to obtain the address of the data preparation server 12 that prepared the command relating to the access profile. The mobile equipment 10 is thus able, after obtaining the address of the data preparation server 12, to request, from the data preparation server 12, the command relating to the profile, such as the initial loading of the profile or the execution of the configuration or an update of an already installed profile. Once it has been obtained, the command relating to the profile is executed on the security module 101. The mobile equipment 10 also comprises a local profile manager 103, or LPA (for Local Profile Assistant). The local profile manager 103 provides an administrative interface for the mobile equipment 10 to the user of the mobile equipment 10. In the case for example of loading a profile for accessing the network on the mobile equipment 10, the local profile manager 103 is designed to recover the profile from the operator via a secure Internet connection to the data preparation server 12 and to command installation thereof and activation thereof on the security module 101. In one exemplary embodiment, the local profile manager 103 is located in the security module 101. It is thus designed to perform calculations, and in particular to generate anonymous identifiers TEID, under the control of the mobile application 102.

Thus, in an initial selection step E0, the user selects, by way of his mobile equipment 10 and using the mobile application 102, a command relating to a profile for accessing the network, such as the initial loading, that is to say the obtainment and the activation, of the profile for accessing the network on the mobile equipment, a configuration of the profile, an update of the rules relating to the profile (known as policy rules), a maintenance operation on the profile, etc.

This selection, in a following information request step E1, triggers the sending of an information request message by the mobile application 102 to the local profile manager 103. This message is intended to obtain physical features of the mobile equipment 10 and of the security module 101. The physical features relate for example to the size of the screen of the mobile equipment 10, the NFC (for near-field communication) communication capabilities of the equipment, the size of the memory of the security module 101, the operating system version, etc. These physical features are intended to be taken into account by the preparation server 12 during the preparation of the command relating to the profile, such that this is adapted to the mobile equipment 10 and to the security module 101 on which it will be executed.

In a following response step E2, the local profile manager 103 sends, in response, physical features of the security module 101 and of the mobile equipment 10.

In a following request step E3, the application 102 sends, to the local profile manager 103, a request for an anonymous identifier of the security module 101.

This request is received by the local profile manager 103 and relayed to the security module 101 in a relaying step E4.

In a following reception and generation step E5, the security module 101 receives the anonymous identifier generation request and derives an anonymous identifier TEID from its physical EID identifier. To this end, it generates a random r for example by way of a pseudorandom generator and applies a one-way function $f$ to the random r and to its physical EID identifier. In other words, it calculates: TEID=$f$(EID, r). It is recalled that a one-way function is a function that is able to be calculated easily but that is difficult to reverse, that is to say that for any x whose image $f(x)$ is known, it is very difficult to find x (again). The one-way function $f$ is for example a hash function, deemed to be irreversible, such as SHA-3 or SHA-256 (for Secure Hash Algorithm). If the one-way function is SHA-256, it is possible, in one exemplary embodiment, to take only the 32 first digits, or the 32 last digits, of the result of the hash function. This makes it possible to take into account size constraints on one or more servers. Specifically, a security module identifier is a value coded on 32 digits. Taking the 32 first or last digits makes it possible to obtain anonymous identifiers of the same size as the physical module identifiers. The invention is of course not limited to these functions. For example, functions recommended by the SOGIS ("Senior Officials Group Information Systems Security") federation and available at: http://www.sogis.org/documents/cc/crypto/SOGIS-Agreed-Cryptographic-Mechanisms-1.0.pdf may be used. The use of a hash function to calculate the anonymous identifier of the security module 101 makes it possible to guarantee the anonymity of the module 101. The function $f$ also has the non-collision property, that is to say that, for any x whose image $f(x)$ is known, it is very difficult to find y such that $f(x)=f(y)$. This property is satisfied in that data at the input of the function has a size smaller than or equal to the output data. This property guarantees the uniqueness of the generated anonymous identifiers. The anonymous identifier TEID thus calculated is sent to the local profile manager 103 at the end of step E5.

The received anonymous identifier TEID is stored by the local profile manager 103 in a storage and sending step E6, and relayed to the mobile application 102.

In a sending step E7, the mobile application 102 sends, to the operator server 11, the physical features of the mobile equipment 10 and of the security module 101 that it obtained at the end of step E2, the generated anonymous identifier TEID and the command relating to the profile for accessing the network selected by the user in initial step E0.

In a following step E8 of sending a request, the operator server 11 sends, to the data preparation server 12, a preparation request that comprises the anonymous identifier TEID and the information necessary to prepare the command relating to the profile for accessing the network. This information comprises the selected command and the physical features of the equipment 10 and of the module 101.

In a following preparation and sending step E9, the data preparation server 12 prepares the command relating to the access profile and that is adapted to the mobile equipment 10. "Prepare the command" means generating a software module comprising a set of code instructions intended to be executed on the security module 101. The preparation server 12 also sends a notification associated with the anonymous identifier TEID of the security module 101 to the discovery server 13. The notification is intended to inform the discovery server 13 that a command has been prepared for a security module whose anonymous identifier is TEID and is available on the data preparation server 12. The discovery server 13 stores that an event is queued for the anonymous identifier TEID of the security module 101; it also stores the address of the data preparation server 12 able to provide the command associated with this event.

In a following phase that is described below and triggered following an intentional action by the user, or automatically, for example after restarting of the mobile equipment 10 or after regular refreshing implemented on the mobile equipment 10, the command relating to the profile for accessing the network is executed following exchanges between the mobile equipment 10, the discovery server 13 and the data preparation server 12.

Thus, in an optional following authentication step E10, mutual authentication between the security module 101 and the discovery server 13 is implemented. The steps of this authentication are described in the GSMA SGP.22 specification, which describes an architecture for remotely providing a profile to a security module (or RSP for remote SIM provisioning). It should be noted that step E10 is optional in this case in that, when it takes place, the security module 101 provides its physical EID identifier to the discovery server 13 in accordance with the SGP.22 specification. It is considered in this case that the user, by taking part in this authentication, implicitly consents to disclosing the physical EID identifier of the security module 101. This step, when it is not executed, does not impact the security of the method. Specifically, the discovery server 13 at this stage only knows an anonymous and random identifier of a security module that it is not able to link to a physical EID module identifier and/or to a security module that it has already dealt with. The anonymity of the security module 101 with respect to the discovery server 13 is thus ensured. In another exemplary embodiment, the optional authentication implemented in step E10 is anonymous. It is based for example on a group cryptographic signature. In this case, the discovery server 13 has the guarantee that the security module 101 that authenticated itself is a valid eUICC module; the discovery server 13 however does not know the EID identifier of the module 101.

In a following information request step E11, the local profile manager 103 sends a request to obtain information relating to one or more events regarding the security module to the discovery server 13. The information obtainment request comprises the anonymous identifier TEID that the local profile manager 103 stored in reception and storage step E7.

In a following response step E12, the discovery server 13 sends the address of the data preparation server 12 that was recorded in association with the anonymous identifier TEID that it received in the previous step to the local profile manager 103.

In a following step E13 of accessing the preparation server, the local profile manager 103 of the mobile equipment 10 connects securely to the data preparation server 12, the address of which was provided thereto in the previous step. The connection is for example in accordance with the TLS (for Transport Layer Security) protocol. The local profile manager 103 provides the temporary identifier TEID of the security module 101 to the data preparation server 12 in order to recover the command relating to the access profile and prepared by the data preparation server 12 in step E10 for the security module 101.

In a following authentication step E14, mutual authentication between the security module 101 and the data preparation server 12 is implemented, in accordance with the GSMA SGP.22 specification. At this stage, the security module 101 has the guarantee of dialoging with a legitimate data preparation server, and the data preparation server 12 has the guarantee of dialoging with a legitimate security module. However, even though it knows the physical EID identifier of the module that authenticated itself, it does not know the anonymous identifier to which this identifier corresponds.

In a following sending of proof step E15, the security module 101 sends the random r used to calculate the anonymous identifier TEID of the module 101 in generation step E5, and possibly its physical EID identifier, to the data preparation server 12. It should be noted that the EID identifier of the module 101 is recovered by the data preparation server 12 in authentication step E14. This sending is intended to allow the data preparation server 12 to identify the security module associated with the anonymous identifier TEID. This sending also constitutes a request by the security module 101 to obtain the command. Moreover, this sending is also proof, for the data preparation server 12, that the temporary identifier TEID for which the command relating to the access profile has been prepared corresponds to the physical EID identifier of the security module 101 that is requesting the command.

In a following calculation and checking step E16, the discovery server 12 calculates a check identifier TEID' from the physical EID identifier and from the random r that it received in the previous step. To this end, the data preparation server 12 applies the same one-way function $f$ as that used by the security module 101 in generation step E5 to the physical EID identifier and to the random r received in step E15. The data preparation server 12 then checks that the check identifier TEID' is the same as the temporary identifier TEID provided to it by the local manager 103 in step E14.

In a first case (branch "ok" in FIG. 1) in which the check identifier TEID' is equal to the temporary identifier TEID, the data preparation server 12 delivers the command that it has prepared for execution to the security module 101 in a delivery step E17. The data preparation server 12 is assured that it is delivering the command that it has prepared to the security module 101 for which it was requested by the operator server 11 in step E8 of sending a preparation request.

In a second case (branch "nok" in FIG. 1) in which the check identifier TEID' does not correspond to the anonymous identifier TEID, the method stops. Specifically, the security module that sent its identifier in step E18 in order to obtain a command is not the one for which the command was prepared following the preparation request sent by the operator server 11 in step E8.

In a following information step E18, the data preparation server 12 sends, to the discovery server 13, a release message intended to inform it that the command relating to the profile and associated with the anonymous check identifier TEID' has been processed. The discovery server 13 is then able to delete the event that it created and stored for the anonymous identifier TEID' at the end of step E9.

In another exemplary embodiment, step E13 of accessing the preparation server, in which the local profile manager 103 connects to the data preparation server 12 and provides it with the temporary identifier TEID of the security module 101, is not implemented. The data preparation server 12 obtains the physical EID identifier of the security module 101 in authentication step E14. It also obtains the random r in sending of proof step E15. In calculation and checking step E16, it calculates a new anonymous identifier TEID" from the random r and from the EID identifier that were received previously, and checks the presence of this anonymous identifier TEID" in a database that contains the anonymous identifiers for which it has queued commands. The uniqueness of the anonymous identifiers, which is inherent to the use of the one-way function $f$ that has the non-collision property, guarantees that the anonymous identifier is associated with a legitimate security module physical identifier.

Figure 2:
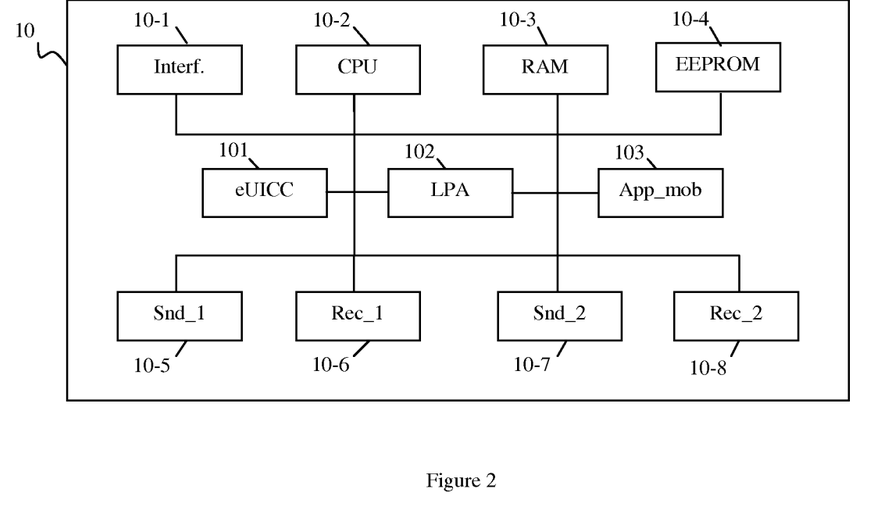
FIG. 2 is a schematic depiction of a mobile equipment, able to implement some of the steps of the method for obtaining a command relating to a profile for accessing a network, according to one exemplary embodiment.

A mobile equipment 10 according to one exemplary embodiment will now be described with reference to FIG. 2.

The mobile equipment 10 is a user equipment such as a mobile terminal or a tablet. It comprises:

- a radio interface 10-1, designed to interface with a mobile communication network,
- a microprocessor 10-2, or CPU (for central processing unit), designed to load instructions into memory, to execute them and to perform operations,
- a set of memories, including a volatile memory 10-3, or RAM (for random access memory), used to execute code instructions, store variables, etc., and an EEPROM (for electronically erasable programmable read-only memory) storage memory 10-4. The storage memory 10-4 is designed to store data and applications. In particular, the storage memory 10-4 stores a software module comprising code instructions for implementing the steps of the method for obtaining a command relating to an access profile,
- a security module 101, for example an eUICC module, designed to store and process sensitive data, such as keys and cryptographic algorithms. In particular, the security module is designed to execute commands relating to a profile for accessing the network that comprises these sensitive data. For example, a command may consist in loading a profile for accessing the network after subscription to a service offer from a network operator, in configuring or in updating the profile, etc.,
- a local profile manager 103 designed to provide an administrative interface for the mobile equipment 10 to the user of the mobile equipment 10. For example, in the case of loading a profile for accessing the network on the mobile equipment 10, the local profile manager 103 is able to recover the profile from the operator via a secure Internet connection to the data preparation server 12 and to command installation thereof and activation thereof on the security module 101,
- a mobile application 102, designed to propose an interface from which the user of the mobile equipment 10 is able to give commands relating to the profile for accessing the network, such as subscribe to a subscription with an operator, request configuration or updating of a profile for accessing the network, etc. The mobile application 102 is provided by a service provider, for example a mobile network operator.

The mobile equipment 10 also comprises:

- first sending means 10-5, designed to send, to a first server 13, an information obtainment request intended to obtain the command, said request comprising an anonymous identifier of the security module calculated from a physical identifier of the module and from a random. The first sending means are designed to implement step E11 of the method for obtaining a command relating to a profile for accessing the network as described above;
- first reception means 10-6, designed to receive, from the first server 13, an address of a second server 12, said second server having prepared the command and associated said command with the anonymous identifier of the security module, a request for said command associated with said anonymous identifier having been received beforehand by the second server from a third server 11. The first reception means 10-6 are designed to implement step E12 of the method described above;
- second sending means 10-7, designed to send, to the second server, the physical identifier of the module and the random. The second sending means 10-7 are designed to implement step E15 of the method described above;
- second reception means 10-8, designed to receive, from the second server, said command when a check, by the second server, that the anonymous identifier of the security module has been calculated from the received physical identifier and from the random is positive. The second reception means are designed to implement step E17 of the method for obtaining a profile for accessing the network as described above.

The local profile manager 103, the mobile application 102, the first sending means 10-5, the first reception means 10-6, the second sending means 10-7 and the second reception means 10-8 are preferably software modules comprising software instructions for implementing the steps of the method for obtaining a command relating to a profile for accessing a network described above.

The invention therefore also relates to:

- a computer program including instructions for implementing the method for obtaining a command relating to an access profile as described above when this program is executed by a processor of the mobile equipment 10,
- a readable storage medium on which the computer program described above is recorded.

Figure 3:
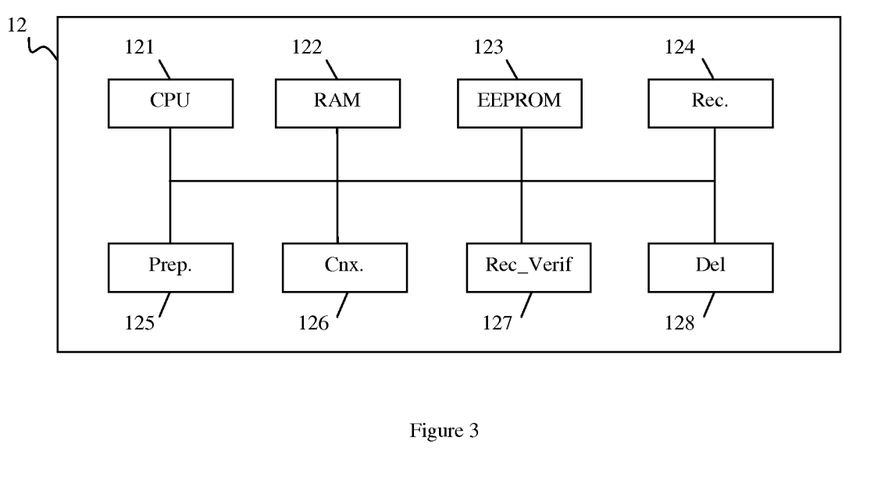
FIG. 3 is a schematic depiction of a data preparation server, able to implement some of the steps of the method for obtaining a command relating to a profile for accessing a network, according to one exemplary embodiment.

A server 12, designed to prepare commands requested from a mobile equipment 10, according to one exemplary embodiment will now be described with reference to FIG. 3.

The server 12 is a computer equipment, accessible from a data network such as the Internet. It comprises:

- a processing unit 121, or CPU, intended to load instructions into memory, to execute them and to perform operations;
- a set of memories, including a volatile memory 122, or RAM used to execute code instructions, store variables, etc., and an EEPROM storage memory 123. In particular, the storage memory 123 is designed to store a software module for providing a command relating to a profile for accessing the network that comprises code instructions for implementing those steps of the method for obtaining a command relating to an access profile that are implemented by the server 12, or data preparation server, as described above.

The server 12 also comprises:

- a reception module 124, designed to receive, from a second server 11, or operator server, a request for said command associated with an anonymous identifier of the security module, said anonymous identifier having been calculated from a physical identifier of the module and from a random. The reception module 124 is designed to implement step E8 of the method for obtaining a command relating to a profile for accessing the network as described above;
- a preparation module 125, designed to prepare said command and to send, to a third server 13, or discovery server, a notification intended to indicate that the command has been prepared. The notification comprises the address of the server and the anonymous identifier. The preparation module 125 is designed to implement step E9 of the method for obtaining a command relating to a profile for accessing the network as described above;

a connection module 126, designed to accept a connection of the mobile equipment to the server, the address of the server 12 having been provided beforehand to the mobile equipment by the third server 13. The connection module 126 is designed to implement step E13 of the method described above;

a reception and checking module 127, designed to receive, from the security module 101, the physical identifier of the module and the random, and to check that the anonymous identifier received from the mobile equipment has been calculated from the physical identifier of the module and from the random. The reception and checking module 127 is designed to implement step E16 of the method for obtaining a command relating to a profile for accessing the network as described above;

a delivery module 128, designed to deliver said command to the mobile equipment 10 when the check is positive. The delivery module 128 is designed to implement step E17 of the method described above.

The reception module 124, preparation module 125, connection module 126, reception and checking modules 127 and the delivery module are preferably software modules comprising software instructions for implementing those steps of the method for obtaining a command relating to a profile for accessing the network as described above and that are implemented by the server 12.

The invention therefore also relates to:
a computer program including instructions for implementing the steps of the method for obtaining a command relating to a profile for accessing the network as described above and that are implemented by the server when this program is executed by a processor of the server 12, or data preparation server,
a readable recording medium on which the computer program described above is recorded.

The invention also relates to a system for providing a command relating to a profile for accessing the network. The system comprises:
at least one mobile equipment 10 as described above,
at least one data preparation server 12, as described above, and
a discovery server 13 that comprises:
a notification reception and storage module, designed to receive, from the data preparation server 12, a notification that comprises the anonymous identifier TEID of the security module, associated with an address of the data preparation server 12. The notification is intended to inform the discovery server 13 that a command relating to a profile for accessing the network has been prepared by the data preparation server 12 and is available to be retrieved by the mobile equipment 10. The anonymous identifier TEID of the security module is stored by the discovery server 13 in association with the address of the preparation server 12;
an information obtainment request reception module, designed to receive, from the mobile equipment 10, an information obtainment request comprising the anonymous identifier of the security module. This request is intended to interrogate the discovery server 13 in order to obtain the address of the data preparation server 12 when an event associated with the anonymous identifier has been stored by the discovery server 13;
a sending module, designed to send, to the mobile equipment, following the reception from the mobile equipment 10 of an information obtainment request, the address of the data preparation server 12 associated with the anonymous identifier. Once the address of the data preparation server 12 has been obtained by the mobile equipment 10, the latter is able to retrieve said command relating to the profile for accessing the network from said data preparation server 12.

The notification reception and storage module, the information obtainment request reception module and the sending module of the discovery server 13 are preferably software modules comprising code instructions for implementing those steps of the method for obtaining a command relating to a profile for accessing the network that are implemented by the discovery server 13.

Although the present disclosure has been described with reference to one or more examples, workers skilled in the art will recognize that changes may be made in form and detail without departing from the scope of the disclosure and/or the appended claims.

The invention claimed is:

1. A method comprising:
providing, to a mobile equipment, via a first server, a command relating to a profile for accessing a network, the command being intended to be implemented on a security module of said equipment, said providing comprising the following acts performed by the first server:
receiving, by the first server from a second server, a request for said command associated with an anonymous identifier of the security module, said anonymous identifier having been calculated from a physical identifier of the module and from a random,
preparing by the first server said command and sending, to a third server, a notification to indicate that the command has been prepared, the notification comprising an address of the first server and the anonymous identifier,
accepting a connection of the mobile equipment to the first server, the connection being addressed to the address of the first server,
receiving, by the first server from the security module, the physical identifier of the module and the random, and checking that the anonymous identifier received from the mobile equipment has been calculated from the physical identifier of the module and from the random, and
delivering by the first server said command when the check is positive.

2. The method according to claim 1, comprising:
sending, by the mobile equipment to the third server, an information obtainment request intended to obtain the command, said request comprising the anonymous identifier of the security module calculated from the physical identifier of the module and from the random,
receiving, by the mobile equipment from the third server, the address of the first server associated with the anonymous identifier of the security module,
sending, by the mobile equipment to the first server, the physical identifier of the module and the random, and
receiving, by the mobile equipment from the first server, said command when a calculation of an anonymous identifier from the physical identifier and the random sent to the first server matches the anonymous identifier of the security module.

3. The method as claimed in claim 2, comprising:
  calculating by the security module the anonymous identifier of the security module by applying a one-way function to the physical identifier of the module and to the random, said one-way function also having a non-collision property, and
  sending said anonymous identifier to the first server.

4. A method for obtaining a command relating to a profile for accessing a network via a mobile equipment, the command being intended to be implemented on a security module of said equipment, said method comprising the following acts performed by the mobile equipment:
  implementing mutual authentication between the security module and a first server, said authentication being representative of an agreement of a user to disclose a physical identifier of the security module to the first server;
  sending, to the first server, an information obtainment request intended to obtain the command, said request comprising an anonymous identifier of the security module calculated from the physical identifier of the module and from a random;
  receiving, from the first server, an address of a second server associated with the anonymous identifier of the security module;
  sending, to the second server, the physical identifier of the module and the random; and
  receiving, from the second server, said command when a calculation of an anonymous identifier from the physical identifier and the random sent to the second server matches the anonymous identifier of the security module.

5. A method for obtaining a command relating to a profile for accessing a network via a mobile equipment, the command being intended to be implemented on a security module of said equipment, said method comprising the following acts performed by the mobile equipment:
  authenticating anonymously the security module to a first server, implemented by way of a group signature algorithm,
  sending, to the first server, an information obtainment request intended to obtain the command, said request comprising an anonymous identifier of the security module calculated from a physical identifier of the module and from a random;
  receiving, from the first server, an address of a second server associated with the anonymous identifier of the security module;
  sending, to the second server, the physical identifier of the module and the random; and
  receiving, from the second server, said command when a calculation of an anonymous identifier from the physical identifier and the random sent to the second server matches the anonymous identifier of the security module.

6. A mobile equipment designed to obtain a command relating to a profile for accessing a network, the command being intended to be implemented on a security module of said equipment, said mobile equipment comprising:
  a processor; and
  a non-transitory computer-readable medium comprising instructions stored thereon, which when executed by the processor configure the mobile equipment to perform acts comprising:
  implementing mutual authentication between the security module and a first server, said authentication being representative of an agreement of a user to disclose a physical identifier of the security module to the first server,
  sending, to the first server, an information obtainment request to obtain the command, said request comprising an anonymous identifier of the security module calculated from the physical identifier of the module and from a random,
  receiving, from the first server, an address of a second server associated with the anonymous identifier of the security module,
  sending, to the second server, the physical identifier of the module and the random, and
  receiving, from the second server, said command when a calculation of an anonymous identifier from the physical identifier and the random sent to the second server matches the anonymous identifier of the security module.

7. A non-transitory computer-readable data medium on which instructions are recorded, which when executed by a processor of a mobile equipment configure the mobile equipment to perform a method of obtaining a command relating to a profile for accessing a network via a mobile equipment, the command being intended to be implemented on a security module of said mobile equipment, said method comprising the following acts performed by the mobile equipment:
  implementing mutual authentication between the security module and a first server, said authentication being representative of an agreement of a user to disclose a physical identifier of the security module to the first server,
  sending, to the first server, an information obtainment request intended to obtain the command, said request comprising an anonymous identifier of the security module calculated from the physical identifier of the module and from a random,
  receiving, from the first server, an address of a second server associated with the anonymous identifier of the security module,
  sending, to the second server, the physical identifier of the module and the random, and
  receiving, from the second server, said command when a calculation of an anonymous identifier from the physical identifier and the random sent to the second server matches the anonymous identifier of the security module.

8. A first server designed to prepare and provide a command relating to a profile for accessing the network requested from a mobile equipment, the command being intended to be implemented on a security module of said equipment, said first server comprising:
  a processor; and
  a non-transitory computer-readable medium comprising instructions stored thereon, which when executed by the processor configure the first server to perform acts comprising:
  receiving, by the first server from a second server, a request for said command associated with an anonymous identifier of the security module, said anonymous identifier having been calculated from a physical identifier of the module and from a random,
  preparing by the first server said command and sending, to a third server, a notification intended to indicate that the command has been prepared, the notification comprising an address of the first server and the anonymous identifier, accepting a connection of the mobile equipment to the first server, the connection being addressed to the address of the first server, receiving, by the first server from the security module, the physical identifier of the module and the random, and checking that the anonymous identifier received from the mobile equipment has been calculated from the physical identifier of the module and from the random, and delivering by the first server said command when the check is positive.

9. A non-transitory computer-readable data medium on which instructions are recorded which when executed by a processor of a first server configure the first server to perform a method of providing, to a mobile equipment, via the first server, a command relating to a profile for accessing a network, the command being intended to be implemented on a security module of said equipment, said method comprising the following acts performed by the first server:

receiving, by the first server from a second server, a request for said command associated with an anonymous identifier of the security module, said anonymous identifier having been calculated from a physical identifier of the module and from a random, preparing by the first server said command and sending, to a third server, a notification to indicate that the command has been prepared, the notification comprising an address of the first server and the anonymous identifier, accepting a connection of the mobile equipment to the first server, the connection being addressed to the address of the first server, receiving, by the first server from the security module, the physical identifier of the module and the random, and checking that the anonymous identifier received from the mobile equipment has been calculated from the physical identifier of the module and from the random, and delivering by the first server said command when the check is positive.

10. A system for providing a command relating to a profile for accessing a network, said system comprising:

a first server and a third server; and a mobile equipment designed to obtain the command relating to a profile for accessing the network, the command being intended to be implemented on a security module of said equipment, said mobile equipment comprising:

a first processor; and a first non-transitory computer-readable medium comprising instructions stored thereon, which when executed by the first processor configure the mobile equipment to perform acts comprising:

sending, to the third server, an information obtainment request to obtain the command, said request comprising an anonymous identifier of the security module calculated from a physical identifier of the module and from a random, receiving, from the third server, an address of the first server associated with the anonymous identifier of the security module, said first server having prepared the command and associated said command with the anonymous identifier of the security module, a request for said command associated with said anonymous identifier having been received beforehand by the first server from a second server, sending, to the first server, the physical identifier of the module and the random, receiving, from the first server, said command when a check, by the first server, that the anonymous identifier of the security module has been calculated from the received physical identifier and from the random is positive;

the first server comprising:

a second processor; and a second non-transitory computer-readable medium comprising instructions stored thereon, which when executed by the second processor configure the first server to perform acts comprising:

receiving, from the second server, the request for said command associated with the anonymous identifier of the security module, preparing said command and sending, to the third server, a notification to indicate that the command has been prepared, the notification comprising an address of the first server and the anonymous identifier, accepting a connection of the mobile equipment, the address of the first server having been provided beforehand to the mobile equipment by the third server, receiving, from the security module, the physical identifier of the module and the random, and checking that the anonymous identifier received from the mobile equipment has been calculated from the physical identifier of the module and from the random, and delivering said command when the check is positive; and the third server comprising:

a third processor; and a third non-transitory computer-readable medium comprising instructions stored thereon, which when executed by the third processor configure the third server to perform acts comprising:

receiving, from the first server, the notification that the command has been prepared, the notification comprising the address of the first server and the anonymous identifier of the security module, receiving, from the mobile equipment, the information obtainment request;

sending, to the mobile equipment, the address of the first server associated with the anonymous identifier, the mobile equipment being able to retrieve said command from said first server.

11. A mobile equipment designed to obtain a command relating to a profile for accessing a network, the command being intended to be implemented on a security module of said equipment, said mobile equipment comprising:

a processor; and a non-transitory computer-readable medium comprising instructions stored thereon, which when executed by the processor configure the mobile equipment to perform acts comprising:

authenticating anonymously the security module to a first server, implemented by way of a group signature algorithm, sending, to the first server, an information obtainment request to obtain the command, said request comprising an anonymous identifier of the security module calculated from a physical identifier of the module and from a random, receiving, from the first server, an address of a second server associated with the anonymous identifier of the security module, sending, to the second server, the physical identifier of the module and the random, and receiving, from the second server, said command when a calculation of an anonymous identifier from the physical identifier and the random sent to the second server matches the anonymous identifier of the security module.

* * * * *